United States Patent
Libsch et al.

(10) Patent No.: US 11,411,739 B2
(45) Date of Patent: Aug. 9, 2022

(54) SMART DEVICE TO IMPOSE TRUST AT THE EDGE OF A BLOCKCHAIN

(71) Applicant: International Business Machines Corporation, Armonk, NY (US)

(72) Inventors: Frank R. Libsch, White Plains, NY (US); Seiji Munetoh, Kawasaki (JP); Abhilash Narendra, White Plains, NY (US); Ghavam G. Shahidi, Pound Ridge, NY (US)

(73) Assignee: Internatiional Business Machines Corporation, Armonk, NY (US)

( * ) Notice: Subject to any disclaimer, the term of this patent is extended or adjusted under 35 U.S.C. 154(b) by 257 days.

(21) Appl. No.: 16/270,145

(22) Filed: Feb. 7, 2019

(65) Prior Publication Data
US 2020/0259658 A1 Aug. 13, 2020

(51) Int. Cl.
*H04L 9/32* (2006.01)
*G06F 21/72* (2013.01)
*H04L 9/00* (2022.01)

(52) U.S. Cl.
CPC ............ *H04L 9/3234* (2013.01); *G06F 21/72* (2013.01); *H04L 9/50* (2022.05)

(58) Field of Classification Search
CPC . H04L 9/3234; H04L 2209/38; H04L 9/0841; H04L 9/0662; H04L 9/3239; G06F 21/72
See application file for complete search history.

(56) References Cited

U.S. PATENT DOCUMENTS

| | | | |
|---|---|---|---|
| 9,928,290 B2 | 3/2018 | Tiell | |
| 2012/0209822 A1* | 8/2012 | Prabhakar | G06F 16/2365 707/703 |
| 2014/0241354 A1* | 8/2014 | Shuman | H04L 12/281 370/390 |
| 2015/0156266 A1* | 6/2015 | Gupta | H04L 67/12 709/224 |
| 2015/0185713 A1* | 7/2015 | Glickfield | G05B 15/02 700/44 |
| 2016/0197772 A1* | 7/2016 | Britt | H04L 63/0428 370/254 |
| 2016/0321654 A1* | 11/2016 | Lesavich | H04L 67/10 |

(Continued)

OTHER PUBLICATIONS

CB Insights webpage. https://www.cbinsights.com,.

(Continued)

*Primary Examiner* — Taghi T Arani
*Assistant Examiner* — Blake I Narramore
(74) *Attorney, Agent, or Firm* — Law Office of Jim Boice

(57) ABSTRACT

A processor-implemented method imposes trust at the edge of a blockchain. A hardware interrogator in a terminal interrogates an Internet of Things Smart Device (IoTSD). The IoTSD is an off-line device that is associated with a physical product. The IoTSD includes a cryptographic processor and one or more state sensors that monitor a state of the physical product. The hardware interrogator detects an event that is described by an encrypted entry in the IoTSD. The terminal transmits, to a blockchain, a transaction that describes the event that is detected by the hardware interrogator, such that the blockchain adds the transaction to a blockchain that is dedicated to the physical product, and the blockchain establishes a state of the physical product.

20 Claims, 11 Drawing Sheets

(56) References Cited

U.S. PATENT DOCUMENTS

| | | | |
|---|---|---|---|
| 2017/0005804 A1* | 1/2017 | Zinder | G06F 21/6254 |
| 2017/0124633 A1* | 5/2017 | Natarajan | G06Q 30/0635 |
| 2017/0310747 A1* | 10/2017 | Cohn | H04L 67/1068 |
| 2017/0364908 A1 | 12/2017 | Smith et al. | |
| 2018/0248699 A1 | 8/2018 | Andrade | |
| 2019/0013948 A1* | 1/2019 | Mercuri | G06F 16/27 |
| 2019/0036906 A1* | 1/2019 | Biyani | H04L 9/3247 |
| 2019/0051390 A1* | 2/2019 | Shah | G06F 16/1824 |
| 2019/0052454 A1* | 2/2019 | Wright | H04L 9/0861 |
| 2019/0158470 A1* | 5/2019 | Wright | G06Q 20/3678 |
| 2019/0361917 A1* | 11/2019 | Tran | G06Q 20/308 |
| 2019/0377904 A1* | 12/2019 | Sinha | H04L 9/3239 |
| 2020/0034454 A1* | 1/2020 | Chamarajnager | H04W 4/38 |
| 2021/0243019 A1* | 8/2021 | Adari | G16Y 30/10 |

OTHER PUBLICATIONS

P. Mell et al., "The NIST Definition of Cloud Computing", National Institute of Standards and Technology, Information Technology Laboratory, Sep. 2011, pp. 1-7.

Ripple, "Join Ripplenet", ripple.com, 2019, pp. 1-8.

S. Nakamoto, "Bitcoin: A Peer-to-Peer Electronic Cash System", www.bitcoin.org, 2008, pp. 1-9.

V. Grewal-Carr et al., "Blockchain Enigma. Paradox. Opportunity", Deloitte LLP, <https://www2.deloitte.com/content/dam/Deloitte/nl/Documents/financial-services/deloitte-nl-fsi-blockchain-enigma-paradox-opportunity-report.pdf>, Retrieved Feb. 6, 2019, pp. 1-25.

IBM, "What is Blockchain?" IBM, <https://www.ibm.com/blockchain/what-is-blockchain>, Retrieved Feb. 6, 2019, pp. 1-6.

The Linux Foundation, "About—Hyperledger", The Linux Foundation, <https://www.hyperledger.org/about> 2018, pp. 1-8.

Ethereum Community, "What Is Ethereum?" <http://www.ethdocs.org/en/latest/introduction/what-is-ethereum.html>, 2016, pp. 1-4.

B. Nguyen et al., "Protocol Specification", <https://github.com/hyperledger-archives/fabric/blob/master/docs/protocol-spec.md> Retrieved Feb. 6, 2019, pp. 1-68.

Wikimedia Foundation, Inc., "Peercoin", wikipedia.org, Last Edited Jan. 2, 2019, pp. 1-2.

M. Castro et al., "Practical Byzantine Fault Tolerance", Proceedings of the Third Symposium on Operating Systems Design and Implementation, New Orleans, USA, Feb. 1999, pp. 1-14.

O. Dagdelen et al., "Security Analysis of the Extended Access Control Protocol for Machine Readable Travel Documents", Information Security: 13th International Conference, ISC 2010, Boca Raton, FL, USA, Oct. 25-28, 2010, Revised Selected Papers, pp. 54-68.

N. Gaski et al., "Concensus Algorithm", <https://github.com/diegomasini/hyperledger-fabric/blob/master/docs/FAQ/consensus_FAQ.md>, Updated Apr. 6, 2016, 1 Page.

Federal Office for Information Security, "BSI TR-03110 Technical Guideline Advanced Security Mechanisms for Machine Readable Travel Documents and Eidas Token", <https://www.bsi.bund.de/EN/Publications/TechnicalGuidelines/TR03110/BSITR03110.html> Retrieved Feb. 7, 2019, pp. 1-3.

Anonymous, "Providing a Secure and Robust Communication Infrastructure to Allow Users' Access to a Bespoke Software Package", IPCOM000211599D, Oct. 13, 2011, pp. 1-5.

Anonymous, "USB Trust Extensions for Secured USB Devices", IPCOM000245301D, Feb. 26, 2016, pp. 1-8.

Anonymous, "Protocol for Enabling Secure Smart Home Network Communication in IOT", IPCOM000247757D, Oct. 6, 2016, pp. 1-6.

A. Ramachandran et al., "Using Blockchain and Smart Contracts for Secure Data Provenance Management", Cornell University, <https://arxiv.org/abs/1709.10000>, Sep. 28, 2017, pp. 1-11.

M. Ferrag et al., "Blockchain Technologies for the Internet of Things: Research Issues and Challenges", Cornell University, <https://arxiv.org/abs/1806.09099>, Jun. 24, 2018, pp. 1-14.

U. Guin et al., "Ensuring Proof-of-Authenticity of IOT Edge Devices Using Blockchain Technology", IEEE, Blockchain—2018: The 2018 IEEE International Conference on Blockchain, Halifax, Canada, Jul. 30-Aug. 3, 2018, pp. 1-8.

* cited by examiner

SMART DEVICE TO IMPOSE TRUST AT THE EDGE OF A BLOCKCHAIN

BACKGROUND

The present invention relates to the field of blockchains, and particularly to blockchains that maintain product records. Still more particularly, the present invention relates to the edge of blockchains at which new transactions are received by the blockchain.

SUMMARY

In one or more embodiments of the present invention, a processor-implemented method imposes trust at the edge of a blockchain. A hardware interrogator in a terminal interrogates an Internet of Things Smart Device (IoTSD). The IoTSD is an off-line device that is associated with a physical product. The IoTSD includes a cryptographic processor, one or more provenance tracking sensors, and one or more state sensors that monitor a state of the physical product. The hardware interrogator detects an event that is described by an encrypted entry in the IoTSD, where the encrypted entry is encrypted by the cryptographic processor in the IoTSD. The terminal transmits, to a blockchain, a transaction that describes the event that is detected by the hardware interrogator, such that the blockchain adds the transaction to a blockchain that is dedicated to the physical product, and the blockchain establishes a state of the physical product.

The described invention is also implemented in a computer system and/or as a computer program product.

DETAILED DESCRIPTION

Figure 1:
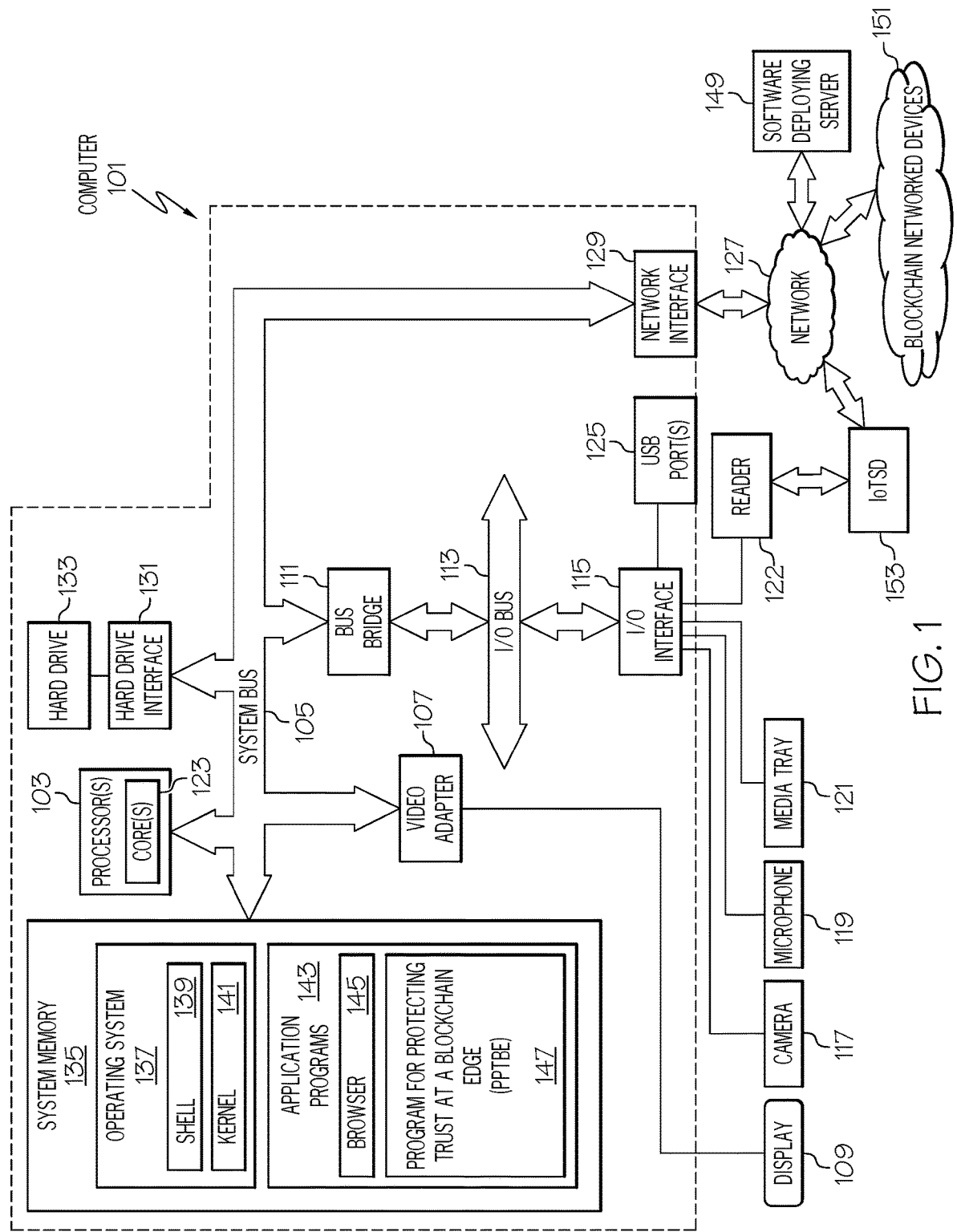
FIG. 1 depicts an exemplary system and network that is used in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is readable storage medium, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or devices within a network of blockchain networked devices 151 and/or Internet of Things Smart Device (IoTSD) 153 shown in FIG. 1, and/or the terminal 401 and/or public ledger server 416 and/or supervisory computer 430 shown in FIG. 4, and/or peer blockchain nodes 501a-501d shown in FIG. 5.

In one or more embodiments of the present invention, exemplary computer 101 includes a processor 103 that is coupled to a system bus 105. Processor 103 utilizes one or more processors, each of which has one or more processor cores 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including by not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc. As such, computer 101 and/or blockchain networked devices 151 and/or IoTSD 153 are devices capable of transmitting and/or receiving wireless and/or Internet broadcasts, such as private/public channel radio or television broadcasts, streaming broadcasts, etc. In embodiment of the present invention, IoTSD 153, described in further detail as IoTSD 253 in FIG. 2, communicates with a reader 122, which is a radio frequency, near field communication, and/or optical reader that is able to scan/read information, including that supplied by the Internet of Things Smart Device (IoTSD) 153.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Protecting Trust at a Blockchain Edge (PPTBE) 147. PPTBE 147 includes code for implementing the processes described below, including those described in FIGS. 2-9. In one embodiment, computer 101 is able to download PPTBE 147 from software deploying server 149, including in an on-demand basis, wherein the code in PPTBE 147 is not downloaded until needed for execution. In one embodiment of the present invention, software deploying server 149 performs all of the functions associated with the present invention (including execution of PPTBE 147), thus freeing computer 101 from having to use its own internal computing resources to execute PPTBE 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

A blockchain is a list of records, called blocks, that are linked to one another using a cryptographic hash of previous blocks, thus providing a distributed ledger of transactions and their updates by a trusted set of blockchain nodes, within a blockchain, that are able to decrypt the hash.

While a blockchain is highly secure due to the nature of the cryptology and members of the blockchain, interfaces with the blockchain are not secure. That is, once a transaction has entered the blockchain, that transaction's integrity is secure. However, in the prior art, the transaction that is entering the blockchain may or may not be valid, since an interface with the blockchain can be hacked.

Thus, a blockchain in the prior art does not enforce trust at its edge, where an "edge" is defined as that part of the blockchain that interacts with external information sources, such as a barcode, a traditional radio frequency identifier (RFID) chip, a universal product code (UPC), a quick response (QR) code, a two-dimensional matrix barcode, etc. That is, a physical barcode can be altered with a pen, an RFID chip can be altered by hacking into the underlying logic in the RFID chip, etc. As such, if a barcode or RFID chip is used to track a product (e.g., in order to have a record of where the product has been and where it is currently located), then altering the barcode/RFID chip will result in a faulty provenance record (showing where the product is and/or has been) within a blockchain.

Therefore, a blockchain on its own does not impose security against corruption of input product data. For example, a blockchain does not prevent a user from counterfeiting or tampering with a product, nor does a blockchain restrict users of a supply chain from altering or tampering with the product or the digital identifier or any state information (location, temperature, etc.) associated with the product.

In order to address this issue, one or more embodiments of the present invention provide a model (protocol) and method of automatically imposing trust at the blockchain interface level, which a blockchain alone cannot impose, through the use of a novel off-line device (described herein as an Internet of Things Smart Device—IoTSD) at the edge of the blockchain.

In one or more embodiments of the present invention, the IoTSD establishes a secure communication channel with the blockchain, and/or automatically imposes transactions on the blockchain.

Figure 2:
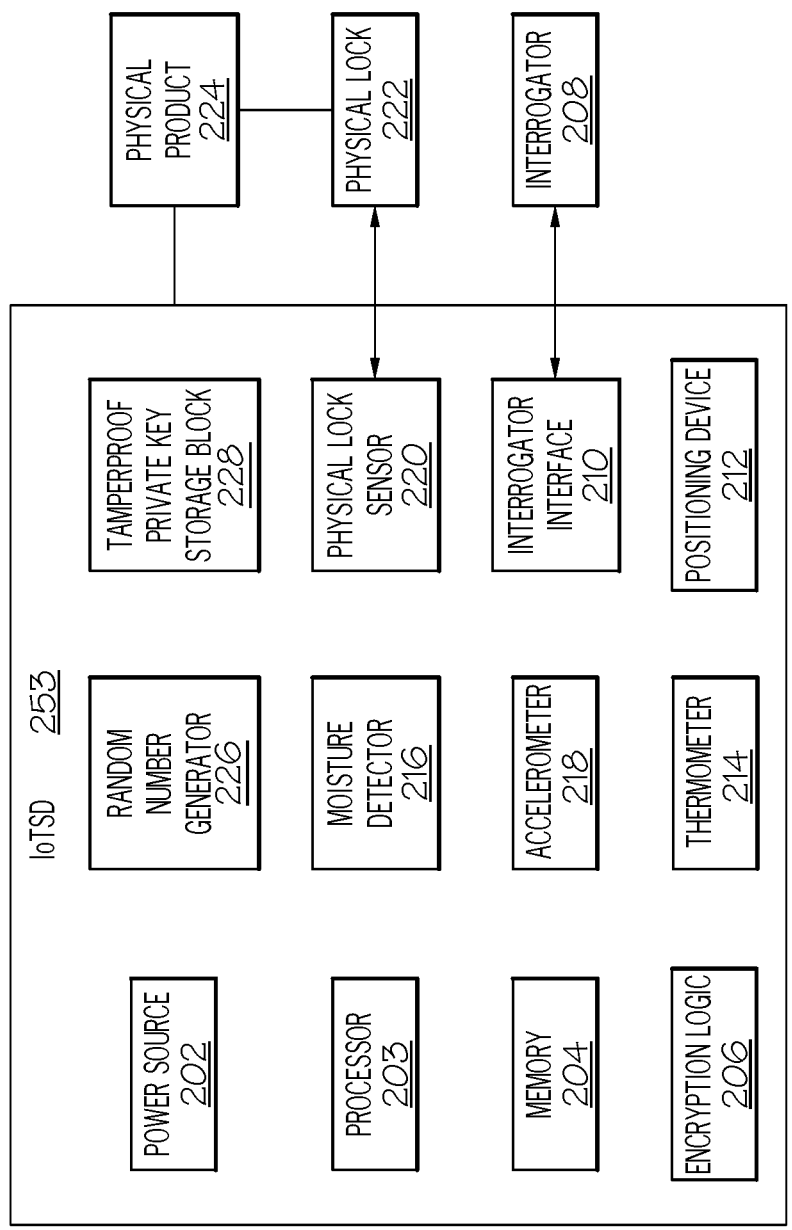
FIG. 2 illustrates an exemplary and novel Internet of Things Smart Device (IoTSD) as utilized in one or more embodiments of the present invention.

With reference now to FIG. 2, an exemplary Internet of Things Smart Device (IoTSD) 253, analogous to the IoTSD 153 shown in FIG. 1, as utilized in one or more embodiments of the present invention is presented.

IoTSD 253 is an off-line chip that tracks the movement, state, and/or environment of a physical product 224 to which it is associated and/or affixed. Unlike a barcode or RFID chip, however, IoTSD 253 is tamper-proof, since any change to information within the IoTSD 253 is provided by off-line components within the IoTSD 253 (i.e., the off-line components are not able to be accessed via a network), and a signature of the IoTSD 253 and/or information held by the IoTSD 253 is encrypted internally by the IoTSD 253.

As shown in FIG. 2, a power source 202 (e.g., a solar panel, a battery, a motion-generated power source, a temperature-generated power source, etc.) provides low power (e.g., 10-100 µW) to components of the IoTSD 153.

A processor 203 (analogous to processor(s) 103 shown in FIG. 1) has limited processing power, and thus uses low power. This low-power usage is enabled by, but not limited to, low power and subthreshold operating circuitry (i.e., small circuits that require small power); frequency cycling (i.e., adjusting processing speed up and down in order to conserve energy); energy conservation processes such as auto-sleep, hibernation, standby, circuit block shutdown, etc.); etc. Processor 203 is able to retrieve sensor readings from various devices within IoTSD 253 and to store these sensor readings in a memory 204, such as a buffer, static memory, dynamic memory, non-volatile memory, etc., within the IoTSD 253.

Within IoTSD 253, and not accessible on-line or by any outside source, are various devices and/or sensors for describing a provenance and/or a state of the physical product 224.

For example, a positioning device 212 (e.g., a global positioning system (GPS) enabled positioning system) tracks movement of the physical product 224. This movement is used to establish where the physical product 224 has been, in order to establish the provenance (i.e., where the physical product 224 was initially manufactured and by whom, where the physical product 224 has been moved to in the past, where the physical product 224 is currently located, etc.). That is, the provenance (origin, movement, etc.) of the physical product 224 is used to establish the authenticity (i.e., what it purports to be, rather than being a counterfeit) of the physical product 224.

A thermometer 214 is a digital device that measures a temperature within or surrounding the physical product 224. For example, assume that physical product 224 is frozen fish, and thermometer 214 detects that the internal and/or surrounding temperature of the frozen fish goes above freezing for more than a predetermined amount of time. As such, the state of the fish is now deemed to be poor, since it has not stayed frozen, and thus is subject to spoilage that would not be evident when the fish is later re-frozen. Thus, readings taken from the thermometer 214 and stored in the memory 204 describe the state (spoiled) of the fish.

A moisture detector 216 is a humidity detector and/or a fluid detector that detects moisture within and/or around the physical product 224. For example, assume that the physical product is a bolt of silk fabric that will be damaged if it gets wet. As such, if the silk gets wet and later dries out, the damage to the silk may or may not be evident by a visual inspection. However, the readings from the moisture detector 216, as stored in the memory 204, provide evidence that the silk has been exposed to moisture and thus is likely damaged (i.e., describes the state of the physical product 224).

An accelerometer 218 detects sudden movement (e.g., being dropped) of the physical product 224. For example, assume that the physical product is a computer that has components that are easily broken if the computer is dropped (e.g., a hard drive, a display, etc.). The accelerometer 218 generates a record of such a drop, which is then stored in the memory 204, thus providing evidence of the state (broken) of components within the computer.

A physical lock sensor 220 detects a state of a physical lock 222 that is part of a protective container (not shown) for the physical product 224. Assume that physical product 224 is a high value product that is stored in and moved about while inside the protective container. Assume further that there is a locking device, such as a mechanical combination lock, a security wire (that, when unbroken, secures a perimeter of the protective container), etc. that prevents the protective container from being opened. For example, assume that the physical lock 222 is a wire that loops through security loops that hold the protective container closed. Assume further that physical lock sensor 220 includes an electronic circuit that, in response to the wire being cut, generates a digital signal (e.g., due to the cut wire causing an "open" in the electronic circuit), thus indicating that the wire has been cut. In response to the wire being cut, a signal (e.g., one or more bits) is sent from the physical lock sensor 220 to the memory 204, along with other descriptive information from the physical lock sensor 220 (e.g., time and date that the wire was cut, whether the cut wire was reattached, etc.). Thus, this information indicates that there is a likelihood that the physical product 224 has been tampered with (altered, replaced, etc.), which describes the state of the physical product 224.

Also within IoTSD 253 is an encryption logic 206. Encryption logic 206 is a dedicated logic in an embodiment of the present invention, and/or is part of processor 203 in another embodiment of the present invention. In either embodiment, encryption logic 206 is able to provide secure communication with a device such as initiating a transaction on the blockchain via a secure channel established through an intermediate interrogator 208, which is further described in FIG. 4.

Encryption logic 206 performs various encryption functions in one or more embodiments of the present invention by using a private and/or public key to encrypt information.

In an embodiment of the present invention, encryption logic 206 creates a digital signature for IoTSD 253, thus providing a secure identification of IoTSD 253. That is, encryption logic 206 creates a digital signature using an encryption key (e.g., a private key in a public:private encryption key pair), when is then decoded using a decryption key (e.g., the public key in the public:private encryption key pair) by interrogator 208 and/or the blockchain networked devices 151 shown in FIG. 1. Thus, an entity (e.g., interrogator 208, one or more of the peer blockchain nodes 501a-501d shown in FIG. 5, etc.) is able to establish a secure communication with the IoTSD 253. This allows a server (e.g., supervisory computer 430 shown in FIG. 4) that supports the blockchain networked device 151 to decode and verify the digital signatures, in order to subsequently establish a secure channel and allow acceptance of any IoTSD initiated transaction for the blockchain. In an embodiment of the present invention, the private key is generated using a random number generator 226, which generates a truly random number that is used as the private key, or as an input to an algorithm that generates the private key. As also shown in IoTSD 253, a tamperproof private key storage block 228 contains the private key used to encrypt and decrypt sensor readings, etc. by the IoTSD 253. This tamperproof private key storage block 228 is made tamperproof by a variety of processes.

In an embodiment of the present invention, the tamperproof private key storage block 228 is protected by an input/output (I/O) interface such as I/O interface 115 shown in FIG. 1 (an integrated into the architecture of IoTSD 253). That is, I/O interface 115 can include a firewall that allows only predefined authorized users (e.g., who are on an authorized list of users) to access the tamperproof private key storage block 228. In one or more embodiments of the present invention, this authorization is provided by the authorized user(s) providing a recognized digital signature, a password, etc., which allows such user(s) to access the tamperproof private key storage block 228. In various embodiments of the present invention, the tamperproof private key storage block 228 is part of system memory in memory 204, and/or is contained within a dedicated secure (e.g., cryptographically protected) separate memory chip (not depicted), which requires a password or other security signal in order to have its contents accessed.

In an embodiment of the present invention, encryption logic 206 encrypts sensor readings received from sensors within the IoTSD 253. For example, assume that positioning device 212 has generated a record of movement of physical product 224 from a manufacturer to a warehouse to a retail outlet. This record, which in an embodiment is stored in memory 204 and/or is part of an internal memory (e.g., a buffer—not shown) within positioning device 212, is encrypted by the encryption logic 206 before it is sent to the interrogator interface 210, in which the encrypted data is made available to the interrogator 208.

Interrogator 208 is an optical, radio frequency, acoustical, etc. enabled device that wirelessly communicates with the interrogator interface 210. The interrogator interface is in communication, preferably via hard wiring, with one or more of the components within IoTSD 253, including those depicted in FIG. 2.

Thus, in one or more embodiments of the present invention the IoTSD 253 does not communicate with the outside world (i.e., any device or resource outside of IoTSD 253) via any avenue other than the interrogator.

Figure 3:
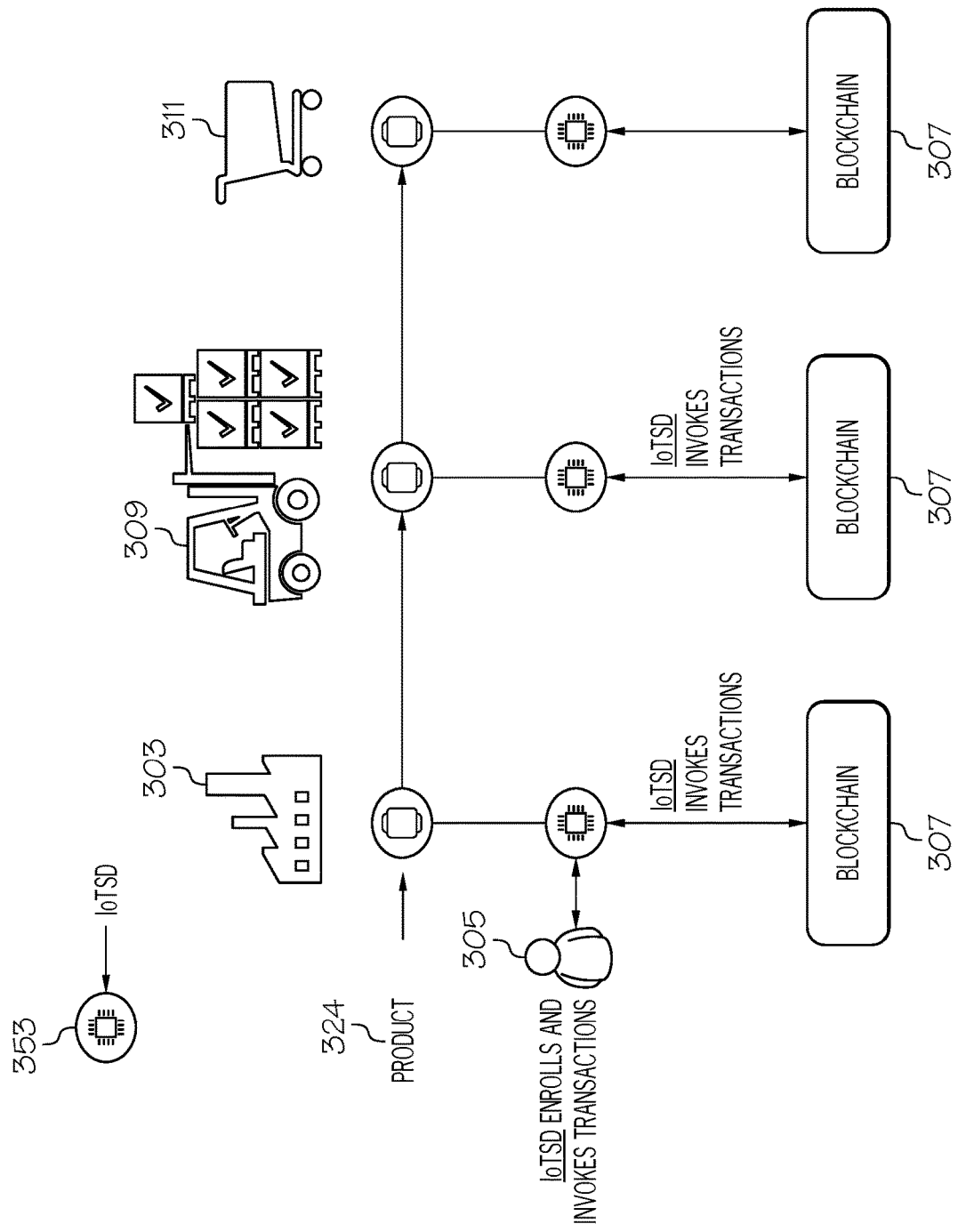
FIG. 3 depicts an exemplary use case for the present invention.

With reference now to FIG. 3, an exemplary use case of an embodiment of the present invention to establish a provenance of a physical product is presented.

Assume that a product 324 (analogous to physical product 224 shown in FIG. 2) begins its existence when built at a manufacturing facility 303. Assume further that an IoTSD 353 (analogous to IoTSD 253 shown in FIG. 2) is affixed to and/or otherwise associated with that specific instance of the physical product 324 (i.e., in an embodiment of the present invention, each instance of the product 324 has its own IoTSD 353 affixed thereon).

In order to ensure that the IoTSD 353 is legitimate when it is created, in an embodiment of the present invention, the IoTSD 353 is enrolled in a membership service, either automatically or by a user 305. From that point on, the IoTSD 353 communicates in a secure manner with a blockchain 307 via an interrogator (e.g., interrogator 408 shown in FIG. 4), in a manner that is not susceptible to interference, altering, hacking, etc. by a third party.

As shown in FIG. 3, each time the product 324 moves to a new location (e.g., a warehouse 309, a retail store 311, etc.), the IoTSD 353 automatically invokes a new transaction, which is sent to the blockchain 307 via an interrogator in order to add the new transaction(s) to a blockchain in the blockchain 307. Thus, whenever the positioning device 212 in FIG. 2 generates a signal indicating that the product 324 has moved to a new location, this information is automatically stored in the memory 204, from which it is retrieved by the interrogator 208. In an embodiment of the present invention, the interrogator interface 210 sends a signal to the interrogator 208 prompting the interrogator to interrogate the IoTSD 253 whenever the product 324 moves from one location to another location (in order to maintain a provenance record of the product 324).

In an embodiment of the present invention, whenever state sensors (e.g., thermometer 214, moisture detector 216, accelerometer 218, physical lock sensor 220, etc.) sense a potential change to the state of the product 324, the interrogator interface 210 sends a signal to the interrogator 208 prompting the interrogator to interrogate the IoTSD 253 in order to maintain a state record of the product 324. In an embodiment of the present invention in which an interrogator 208 is not presently available and/or nearby, the IoTSD 253 stores the state record of the product 324 in the memory 204 shown in FIG. 2, such that this state record is available at a later time for interrogation by the interrogator 208 via the interrogator interface 210 shown in FIG. 2.

Figure 4:
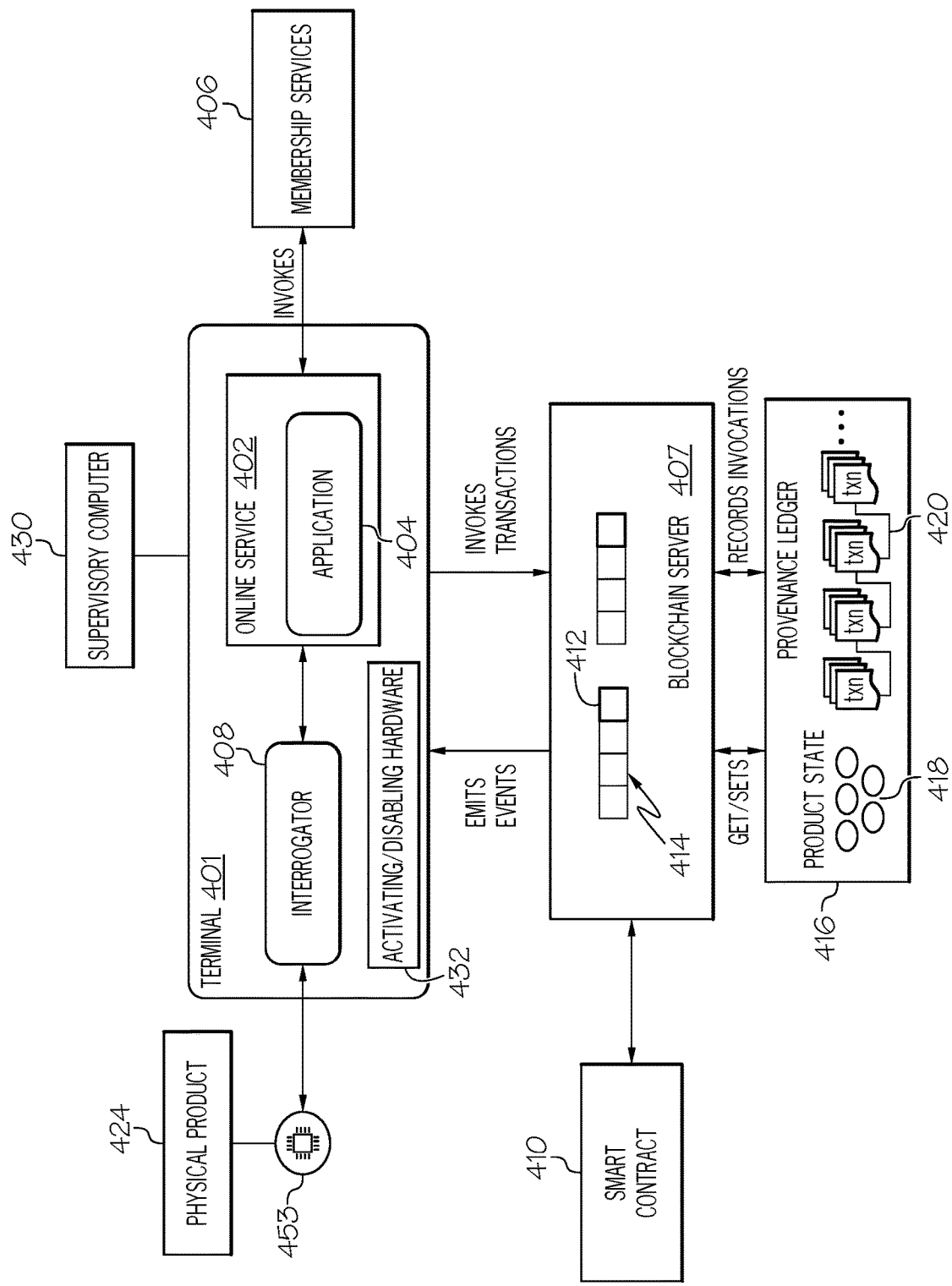
FIG. 4 illustrates a high level overview of one or more embodiments of the present invention.

With reference now to FIG. 4, a high level overview of one or more embodiments of the present invention is presented.

As in FIG. 2, assume that an IoTSD 453 (analogous to IoTSD 253 shown in FIG. 2) is affixed to and/or otherwise associated with a particular instance of a physical product 424 (analogous to physical product 224 shown in FIG. 2).

As described above, IoTSD 453 is off-line, meaning that it cannot be accessed via a network or otherwise hacked into. However, in order to extract (preferably encrypted) information from the IoTSD 453, an interrogator 408 (analogous to interrogator 208 shown in FIG. 2) is able to interrogate the memory, sensors, devices, etc. within the IoTSD 453. In an embodiment of the present invention, the interrogator 408 is part of a terminal 401, which is a computing device analogous to computer 101 shown in FIG. 1. In various embodiments of the present invention, terminal 401 is any type of computing device, including but not limited to, a fixed location computer (e.g., a desktop computer), a laptop computer, a smart phone, etc., that is able to support the interrogator 408.

In an embodiment of the present invention, the interrogator 408 passes through the (encrypted) state and provenance information from the IoTSD 453 to a blockchain server 407 (which supports the blockchain 307 shown in FIG. 3). However, since the IoTSD 453 is off-line (i.e., cannot communicate with any networked device), an online service 402 within the terminal 401 provides an online interface with both the blockchain server 407 as well as (in one or more embodiments) membership services 406.

As shown in FIG. 4, an application 404, which is within the online service 402 (as depicted) and/or is a component of the interrogator 408 invokes communications with membership services 406 and/or the blockchain server 407.

Assume that, in one or more embodiments of the present invention, the online service 402 has a record of the IoTSD 453, including its identity, which physical product 424 it is associated with, and/or the components/features of the IoTSD 453. Assume further that the IoTSD 453 is enrolled in the membership services 406 (e.g., through terminal 401).

Membership services 406 is an application (preferably in a "cloud" of on-demand resources) that enrolls members (e.g., IoTSD devices) that are then expressly identified. As such, IoTSD's that are enrolled with membership services 406 are allowed to communicate with blockchain server 407.

Thus, online service 402 first enrolls IoTSD 453 with the membership services 406, and then the same or other terminal 401 containing the online servicer 402 confirms (at a later time) that this specific IoTSD 453 is still allowed to communicate with blockchain server 407 (i.e., IoTSD 453 is still enrolled with membership services 406).

That is, once the particular IoTSD 453 is enrolled with membership services 406, any data, encrypted or otherwise, extracted from IoTSD 453 by interrogator 408 is allowed to pass through interrogator 408 and online service 402 to the blockchain server 407 as an invoked transaction.

For example, assume that IoTSD 453 detects a change in location of the physical product 424. This change in location causes a new sensor reading in the positioning device 212 shown in FIG. 2, which results in new (provenance) location data. This new location data is deemed to be a transaction 412, which is appended to each copy of a blockchain 414 found in the blockchain server 407.

In an embodiment of the present invention, once the blockchain 414 has been updated with the transaction 412 in the blockchain server 407, the updated blockchain 414 is made available in a public or private ledger server 416, which converts the blockchain 414 into a set of product state records 418 and a set of provenance ledgers 420. That is, processing logic within public/private ledger server 416 determines whether transaction 412 is product state information (e.g., if the physical product has melted, has gotten wet, has gotten too cold or too hot, etc.) or provenance information (i.e., where the product has been and/or where it is currently located). The public/private ledger server 416 makes this determination by examining what type of data (e.g., temperature data for product state or positioning data for provenance) is in the transaction 412, and then selectively stores this data in either the product state records 418 or the provenance ledger 420.

The communication between blockchain server 407 and public/private ledger server 416 is one-way. That is, blockchain server 407 is able to update/populate the product state records 418 and/or the provenance ledgers 420. However, public ledger server 416 is unable to affect/change/alter the blockchains (e.g., blockchain 414) within the blockchain ledger. An embodiment of the present invention that ensures that this communication is one-way enrolls each node within the blockchain server 407 with membership services 406. That is, since membership services 406 enrolls (and thus authorizes) the IoTSD 453 and/or the interrogator 408 and/or the nodes in the blockchain server 407 are the only devices that are authorized to handle data from IoTSD 453, then any attempt by the public/private ledger server 416 to send a transaction to the blockchain server 407 (in order to modify the blockchain 414) is thwarted.

Furthermore, in an embodiment of the present invention, interrogator 408 is enrolled with membership services 406, in order to enable membership services 406 to identify which interrogators can selectively be activated/deactivated by a supervisory computer 430 (e.g., computer 101 shown in FIG. 1).

As depicted in FIG. 4, a smart contract 410 describes how data is put into the blockchains in the blockchain 414. For example and in an embodiment of the present invention, smart contract 410 specifies that interrogator 408 interrogates IoTSD 453 every certain period of time (e.g., daily), thus resulting in a new daily transaction 412 to be added to the blockchain 414.

Figure 5:
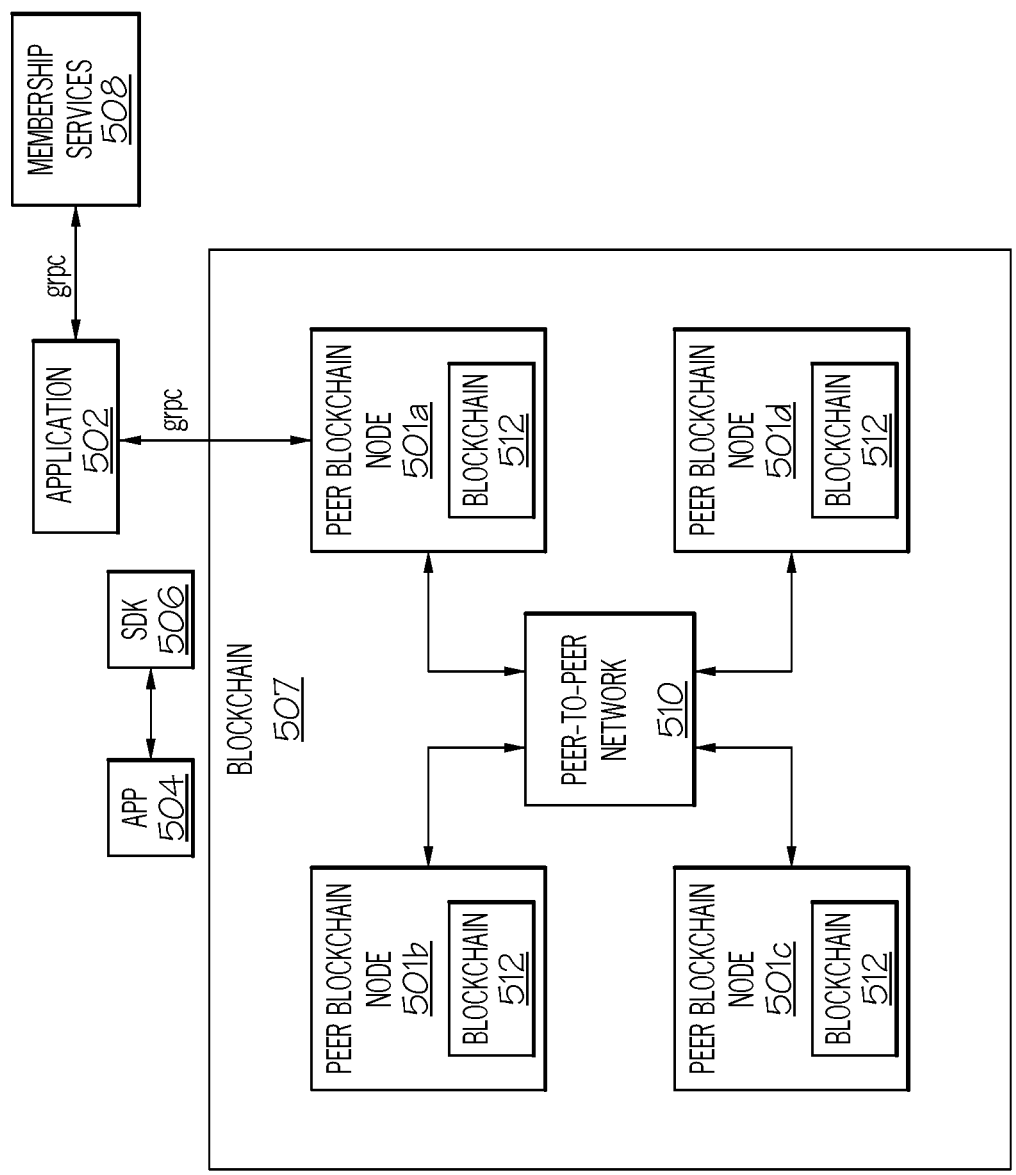
FIG. 5 depicts additional detail of an exemplary blockchain topology as used in one or more embodiments of the present invention.
Figure 6:
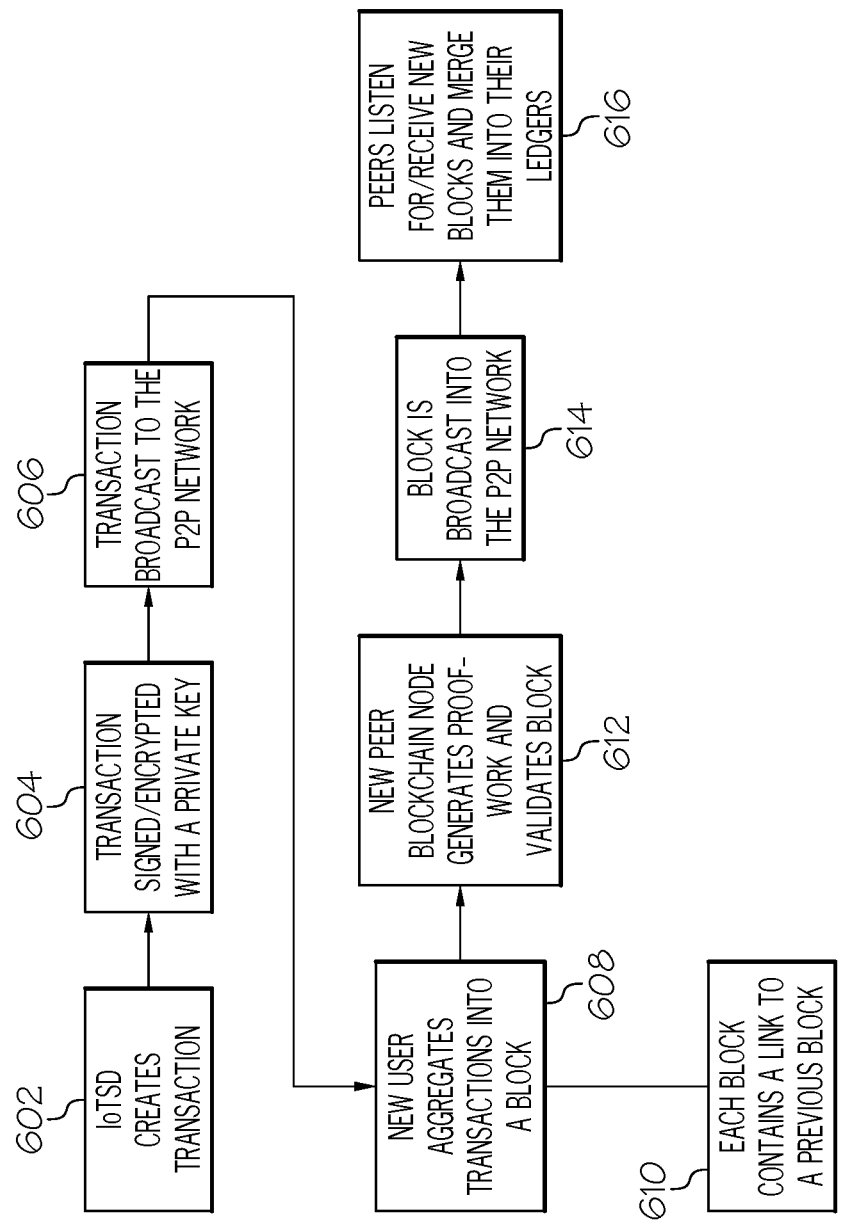
FIG. 6 illustrates a high-level use of a blockchain in accordance with one or more embodiments of the present invention.

With reference now to FIGS. 5-6, additional detail of a blockchain and its operation as used by the present invention is presented.

In one or more embodiments of the present invention, a blockchain, such as blockchain 507 depicted in FIG. 5 is used to provide the infrastructure (e.g. execution of chain-codes) and services (e.g., membership services 406 that provides identity management) for securely and transparently storing, tracking and managing transactions on a "single point of truth". The blockchain 507 maintains a verifiable record (of the single point of truth) of every single transaction ever made within the system. Once data are entered onto the blockchain, they can never be erased (immutability) or changed. That is, any correction to data in blockchain is accomplished by issuing a new transaction, thus preserving the provenance that show the original (in error) transaction as well as the new issued transaction that compensated for the original (in error) transaction. This ensures auditability and verifiability of data.

The blockchain 507 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public/private ledger.

When a transaction is executed, its corresponding chaincode is executed by several validating peers of the system. For example, as shown in FIG. 5, peer blockchain nodes 501*a*-501*d* (i.e., different computers, servers, etc.) establish the validity of the transaction parameters and, once they reach consensus, a new block is generated and appended onto the blockchain network. That is, an application process 502 running on a client (e.g., application 404 shown in FIG. 4) executes an application such as the depicted App 504, causing a software development kit (SDK) 506 to communicate using general remote procedure calls (grpc) to membership services 508 that support the peer-to-peer network 510 that supports the blockchain 512 using the peer blockchain nodes 501*a*-501*d*.

Exemplary operation of the open blockchain 507 shown in FIG. 5 is presented in FIG. 6. As described in step 602, an IoTSD (e.g., IoTSD 453 shown in FIG. 4) creates a transaction (e.g., by creating updated descriptive data for physical product 424). As shown in step 604, the IoTSD 453 signs and encrypts the transaction with a private key, such as SHA-2. This SHA-encrypted transaction is then broadcast to the peer-to-peer network 510, as described in step 606. A node (e.g., peer blockchain node 501*c*) aggregates the transaction(s) into blockchain 512, as shown in step 608. As shown in descriptive box 610, each block contains a link to a previous block. The newly-revised blockchain 512 is validated by one or more of the other peer blockchain nodes in peer blockchain nodes 501*a*-501*d* (step 612), and is then broadcast to the peer blockchain nodes 501*a*-501*b* and peer blockchain node 501*d*, as described in step 614. These peer blockchain nodes 501*a*-501*b* and peer blockchain node 501*d* listen for and receive the new blocks and merge them into their copies of blockchain 512 (step 616).

Thus, the open blockchain 507 shown in FIG. 5 is a blockchain deployment topology that provides a distributed ledger, which persists and manages digital events, called transactions, shared among several peer blockchain nodes. The ledger can only be updated by consensus among the peer blockchain nodes. Furthermore, once transactions are recorded, they can never be altered (they are immutable). Every such recorded transaction is cryptographically verifiable with proof of agreement from the peer blockchain nodes, thus providing a robust provenance mechanism tracking the origination, provenance, and state of physical product 424.

As such, a blockchain uses a distributed network to maintain a digital ledger of events, thus providing excellent security for the digital ledger, since the blockchain stored in each peer blockchain node is dependent upon earlier blocks, which provide encrypted data for subsequent blocks in the blockchain.

That is, the open blockchain 507 shown in FIG. 5 provides a decentralized system in which every peer blockchain node in a decentralized system has a copy of the blockchain. This avoids the need to have a centralized database managed by a trusted third party.

Figure 7:
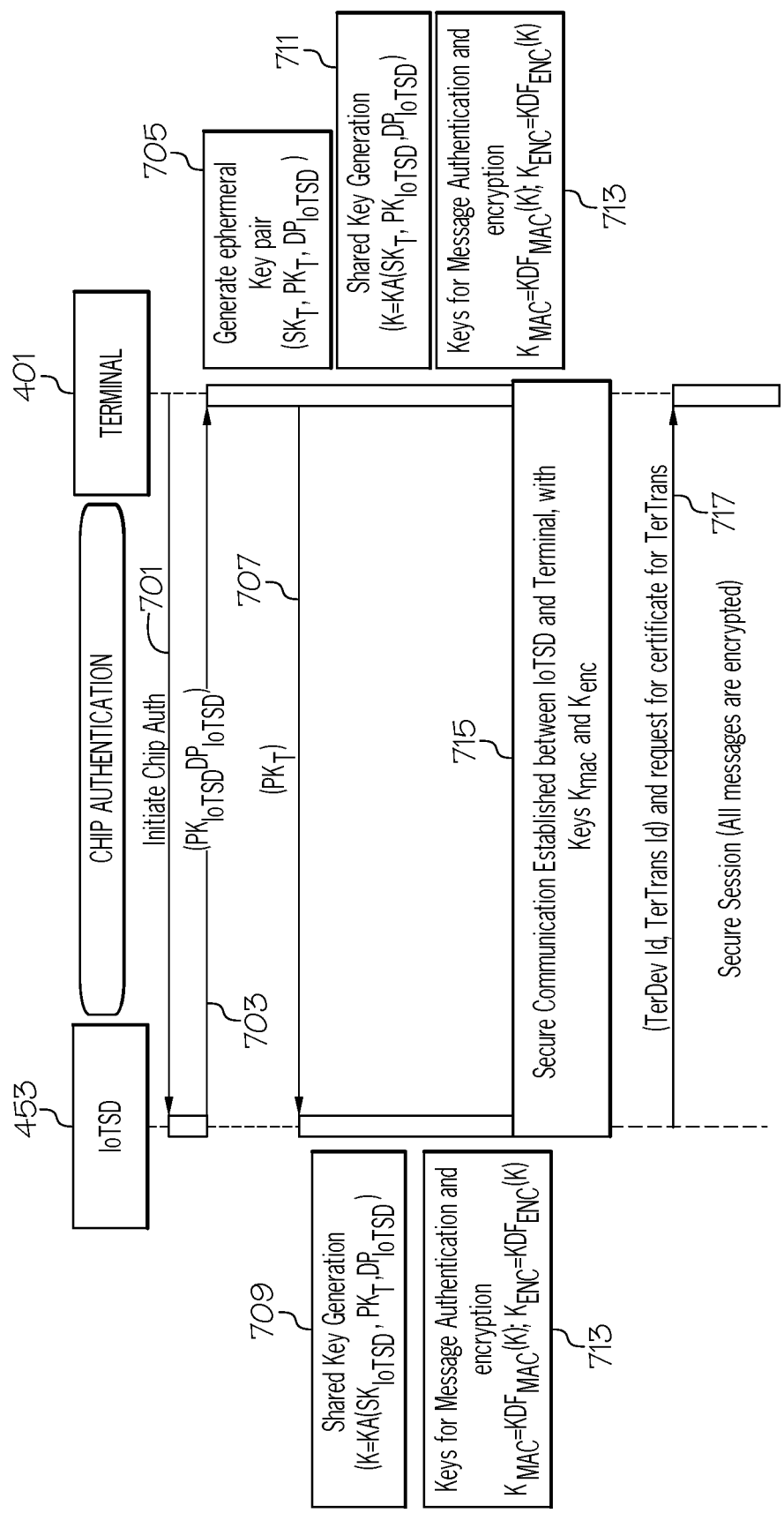
FIG. 7 depicts a chip authentication process for authenticating an Internet of Things Smart Device (IoTSD) in accordance with one or more embodiments of the present invention.
Figure 8:
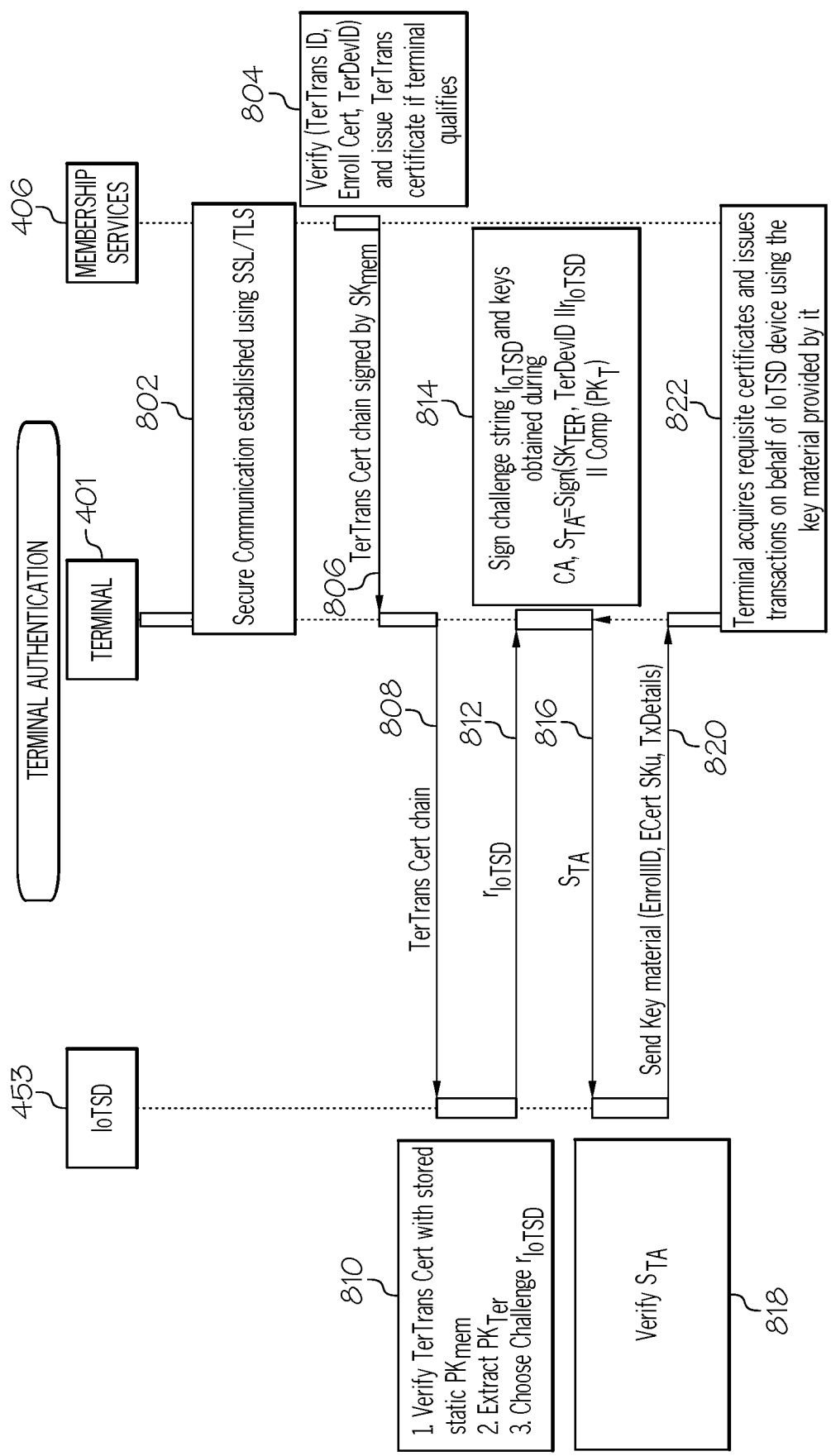
FIG. 8 illustrates a terminal authentication process for authenticating a terminal that interacts with the IoTSD discussed in FIG. 7.

Returning to FIG. 4, IoTSD 453 communicates securely with terminal 401, and terminal 401 communicates securely with membership services 406. FIG. 7 and FIG. 8 present exemplary embodiments of the present invention for establishing these secure connections. That is, FIG. 7 describes a process for chip authentication in accordance with one or more embodiments of the present invention, and FIG. 8 describes a process for terminal authentication in accordance with one or more embodiments of the present invention.

Chip authentication provides at least two functions.

First, chip authentication proves that the chip (i.e., the IoTSD) is genuine, such that only a genuine chip can implement communication securely.

Second, chip authentication establishes a strongly secured communication channel, using a chip-specific key pair with strong encryption and integrity. That is, since IoTSD 453 initiates and establishes the secure channel and verifies end recipients of the intended blockchain server 407, terminal 401 is a conduit that provides connectivity to the intended blockchain server 407.

Terminal authentication is used to determine whether the interrogator system is allowed to read sensitive data from the IoTSD. The mechanism is based on digital certificates which come in the format of card verifiable certificates.

Each inspection system is granted a terminal transaction certificate from a document verifier.

The terminal transaction certificate allows the inspection system to request one or more items of sensitive data from the IoTSD, such as data for key material or sensor data.

A document verifier certificate is then granted from membership services.

With reference then to FIG. 7, a swim-lane diagram of an exemplary method of chip authentication of IoTSD 453 with terminal 401 is presented.

As shown in step 701, the terminal 401 initiates a chip authentication of IoTSD 453.

As shown in step 703, the IoTSD 453 responds to the chip authentication initiation by returning an encryption public key $PK_{IoTSD}$ and a domain parameter $DP_{IoTSD}$ to the terminal 401.

The public key $PK_{IoTSD}$ is created by the encryption logic 206 shown in IoTSD 253 in FIG. 2, and is used to decrypt an encrypted identifier of the IoTSD 453 and/or to decrypt encrypted provenance/state data generated internally by the IoTSD 453, as described above.

The domain parameter $DP_{IoTSD}$ describes the algorithm used create the public key $PK_{IoTSD}$, and thus the associated secret (private) key that is used by IoTSD 453 for encrypting data. Examples of such algorithms include, but are not limited to, an Elliptical Curve Digital Signature Algorithm (ECDSA) such as SECP256K1, an Elliptic Curve Diffie-Hellman (ECDH) algorithm, a Secure Hash Algorithm (SHA) such as SHA-256, etc.

As shown in step 705, the terminal 401 is thus able to generate its own private:public key pair of private terminal secret key $SK_T$ and terminal public key $PK_T$ using the same domain parameter $DP_{IoTSD}$ that was used by IoTSD 453.

Alternatively, terminal 401 generates a static private:public key pair using domain parameter $DP_{IoTSD}$. That is, if the private:public key pair is static (e.g., by using a static Diffie-Hellman algorithm that uses the same Diffie-Hellman private key for every encryption:decryption process), then the system receives a certificate from an authorized encryption supervision service, which authenticates the key each time it is used.

However, if the private:public key pair is ephemeral (e.g., by using an ephemeral algorithm such as Ephemeral Diffie-Hellman in which a temporary key is generated for each exchange), then a previously used key does not affect forward secrecy, since the same key is never used twice. However, since ephemeral keys are temporary, they are often not authenticated (thus exposing the system to a "man in the middle" attack). If authentication of an ephemeral key is desired, then at least one of the keys in the private:public key pair is static, such that the static key is authenticated by the authorized encryption supervision service.

With reference now to step 707 in FIG. 7, once the terminal 401 has generated its terminal public key $PK_T$, this terminal public key $PK_T$ is then sent to the IoTSD 453.

As shown in step 709, the IoTSD 453 now has all the information (i.e., a chip Secret Key $SK_{IoTSD}$, the terminal public key $PK_T$, and the domain parameter $DP_{IoTSD}$) needed to generate a shared public key K using a shared key generator such as Key Algorithm (KA). An exemplary KA is an Elliptic Curve Diffie-Hellman (ECDH) algorithm.

As shown in step 711, the terminal 401 also now has all the information (i.e., the terminal secret key $SK_T$, the chip public key $PK_{IoTSD}$, and the domain parameter $DP_{IoTSD}$) needed to generate a shared public key K using a shared key generator such as Key Algorithm (KA).

As shown in block 713, the IoTSD 453 and the terminal 401 are now able to use a Key Derivation Function (KDF), such as a pseudorandom function, a cryptographic hash function, etc., to derive a secret key from the shared public key K (see step 709 and step 711 above) for both authenticating messages (i.e., $K_{MAC}$ and encrypting messages ($K_{ENC}$).

That is, a message authentication key $K_{MAC}$, such as a digital signature, is derived from $KDF_{MAC}$ (a KDF used to generate a public message authentication key).

A message encryption key $K_{ENC}$ is derived from $KDF_{ENC}$ (a KDF used to generate a public message encryption key). In an embodiment of the present invention, $KDF_{MAC}$ and $KDF_{ENC}$ are a same KDF, while in another embodiment of the present invention, $KDF_{MAC}$ and $KDF_{ENC}$ are different types of KDFs. For example, in an embodiment of the present invention $KDF_{MAC}$ uses a pseudorandom function that ensures that each generated message authentication key $K_{MAC}$ is different, while $KDF_{ENC}$ uses a cryptographic hash function such as SHA-2.

As shown in block 715, a secure communication is now established between IoTSD 453 and terminal 401 using keys $K_{MAC}$ and $K_{ENC}$. This allows IoTSD 453 to send to terminal 401 a request for a certificate for an identified terminal transaction (TerTrans_id) with terminal 401, as identified by the terminal device identifier TerDev_id. That is, the IoTSD 453 requests that terminal 401 obtain, from membership services 406 shown in FIG. 4, a certificate showing that IoTSD 453 and terminal 401 are authorized to have an encrypted communication session. As shown in line 717, the IoTSD 453 then establishes a secure session with terminal 401.

Besides authenticating IoTSD 453 as shown in FIG. 7, in one or more embodiments of the present invention, terminal 401 is also authenticated, as described in FIG. 8.

With reference then to FIG. 8, a secure communication session is established between terminal 401 and membership services 406, as shown in block 802. This secure communication session is established using a secure protocol such as the Secure Sockets Layer (SSL) protocol, the Transport Layer Security (TLS) protocol, etc.

As shown in block 804, if terminal 401 is enrolled with the membership services 406, then membership services 406 issues a terminal transaction (TerTrans) certificate (based on the TerTrans_id, TerDev_id described above, as well as an enrollment certificate (Enroll Cert) verifying that the terminal 401 is enrolled with membership services 406).

As described in step 806, membership services 406 creates a secret key ($SK_{mem}$), which is used to digitally sign messages from terminal 401 using a terminal transaction certificate (TerTran Cert) that is created by the membership services 406.

As shown in step 808, the terminal 401 then digitally signs messages from a chain of messages from terminal 401 to IoTSD 453 using the TerTran Cert that was created by membership services 406.

As shown in block 810, the IoTSD 453 then performs three operations.

First, IoTSD 453 decrypts the TerTran Cert using the public key $PK_{MEM}$ that it received in the process described in FIG. 7.

Second, IoTSD 453 extracts a static terminal public key $PK_{TER}$ from the TerTrans Cert.

Third, IoTSD 453 then chooses a particular challenge, such as a request ($r_{IoTSD}$) for a password, to be sent to the terminal 401.

As shown in step 812, this challenge ($r_{IoTSD}$) is then sent from the IoTSD 453 to the terminal 401.

As shown in block 814, terminal 401 is thus able to 1) sign the challenge string $r_{IoTSD}$ and 2) generate a secret (private) key for terminal transactions with the IoTSD 453 using a static secret key created by terminal 401 ($SK_{TER}$), an identifier for terminal 401 (TerDevID), and the ephemeral terminal public key $PK_T$ described above. This secret key for terminal 401 is then used to sign transactions ($S_{T4}$) going from terminal 401 to IoTSD 453, as shown in step 816.

As shown in block 818, the IoTSD 453 then verifies that the transaction $S_{T4}$, and then, as shown in block 820, sends key materials such as the enrollment identifier (EnrollID) of the IoTSD 453 with membership services 406; an electronic certificate ($E_{CERT}$) verifying that IoTSD 453 is enrolled with membership services 406; a stockkeeping unit (Sku) of the physical product 424 being tracked by IotSD 453; and transaction details (TxDetails) of data being supplied by the sensors/devices within IoTSD 253 shown in FIG. 2.

As shown in block 822, the terminal 401 acquires certificates of registration from membership services 406, and then issues transactions (i.e., product provenance and/or product state information for physical product 224 that IoTSD 253 in FIG. 2 has generated) to the blockchain server 407 shown in FIG. 4. In one or more embodiments of the present invention, these transactions are encrypted using the private key that is created by either IoTSD 453 or terminal 401.

Figure 9:
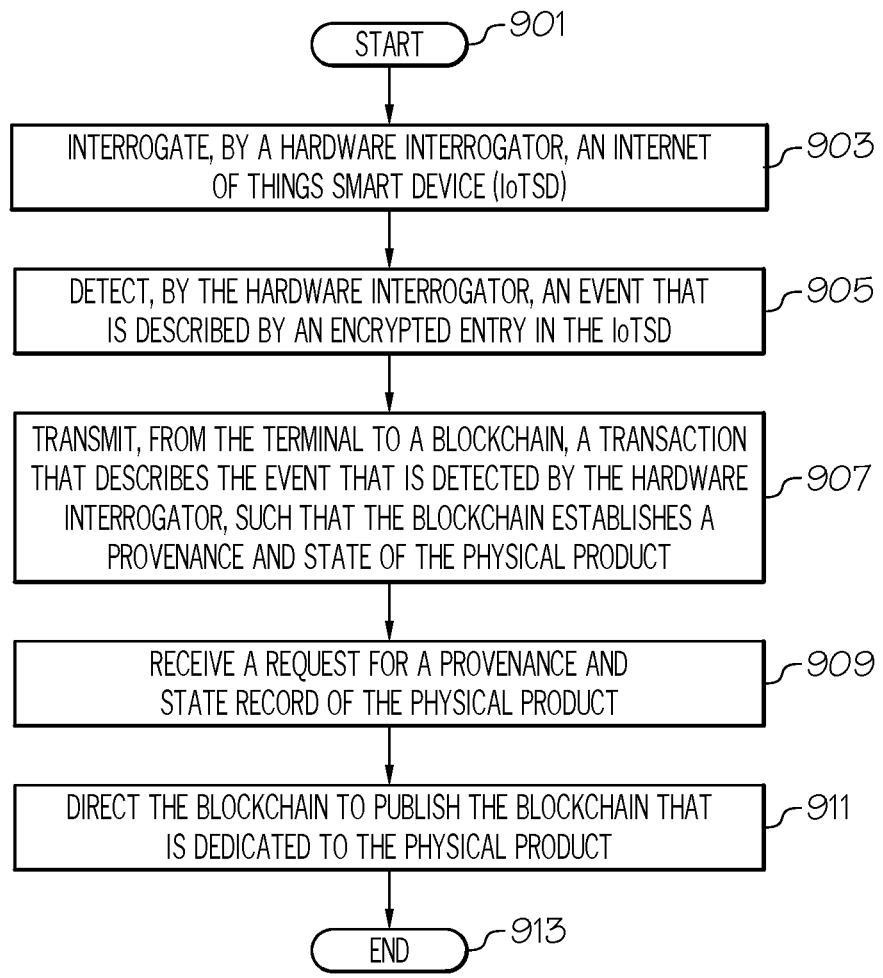
FIG. 9 is a high-level flow-chart of one or more steps performed in a processor-based method in accordance with one or more embodiments of the present invention.

With reference now to FIG. 9, a high-level flow-chart of one or more steps performed in a processor-based method in accordance with one or more embodiments of the present invention is presented.

After initiator block 901, and as described in block 903, a hardware interrogator in a terminal (e.g., interrogator 408 associated with and/or within terminal 401 as shown in FIG. 4) interrogates an Internet of Things Smart Device (IoTSD), such as IoTSD 453 shown in FIG. 4. As depicted in FIG. 4, the IoTSD is an off-line device (i.e., cannot be accessed via a network) that is associated with a physical product (e.g., physical product 424 shown in FIG. 4). As described herein, in one or more embodiments of the present invention, the IoTSD is verified for use with the physical product by a membership service (e.g., membership services 406 shown in FIG. 4).

As depicted in FIG. 2, in an embodiment of the present invention, the IoTSD includes: a cryptographic processor (e.g., encryption logic 206 shown in FIG. 2); one or more provenance tracking sensors (e.g., positioning device 212 shown in FIG. 2); and one or more state sensors (e.g., thermometer 214, moisture detector 216, accelerometer 218, physical lock sensor 220 shown in FIG. 2) that monitor a state of the physical product.

Returning to FIG. 9 and as described in block 905, the hardware interrogator detects an event that is described by an encrypted entry in the IoTSD, where the encrypted entry is encrypted by the cryptographic processor in the IoTSD. That is, the event is a change to a provenance and/or state of the physical product, and the event is an encrypted entry in the IoTSD. For example, and in an embodiment of the present invention, the encrypted entry (which was encrypted using the encryption logic 206 shown in FIG. 2) is either buffered within one or more of the sensors/detectors shown in FIG. 2, and/or is stored in the memory 204 shown in FIG. 2. In an embodiment of the present invention, the provenance/state data is stored unencrypted in memory 204, and then encrypted before being sent to the interrogator interface 210 for interrogation by the interrogator 208. In another embodiment of the present invention, the provenance/state data is stored encrypted in memory 204.

As described in block 907, the terminal transmits to a blockchain (e.g., supported by blockchain server 407 shown in FIG. 4) a transaction that describes the event that is detected by the hardware interrogator. As described herein, the blockchain adds the transaction 412 shown in FIG. 4 to a blockchain (e.g., blockchain 414) that is dedicated to the physical product. As such, the blockchain establishes a provenance and state of the physical product by keeping a record of the transactions associated with the physical device.

As described in block 909, the terminal subsequently receives a request for a provenance and state record of the physical product. For example, in an embodiment the request comes from an operator of the terminal, a user of the IoTSD, a third-party entity that is authorized to be obtain a copy of the provenance and state record, etc.

As described in block 911, the terminal, in response to receiving the request for the provenance and state record of the physical product, directs the blockchain to publish the blockchain that is dedicated to the physical product (e.g., to the public ledger server 416 shown in FIG. 4). As described above, however, the requester of the provenance/state data is not able to directly access the blockchain server 407. Thus, the requester can obtain a copy of the provenance/state data found in the blockchain, but is unable to modify (or even directly access) the blockchain that is within the blockchain.

The flow-chart ends a terminator block 913.

As described herein, in an embodiment of the present invention the IoTSD is physically attached to (affixed to) the physical product. In a further embodiment of the present invention, if the IoTSD is removed from the physical product (e.g., as detected by a sensor such as physical lock sensor 220 shown in FIG. 2 detecting that a wire that holds the IoTSD to the physical product is cut), then this results in a generation of a provenance transaction, indicating that the IoTSD is no longer trustworthy for showing an accurate record of where the physical product is and/or has been.

In an embodiment of the present invention, wherein the cryptographic processor (e.g. encryption logic 206 shown in FIG. 2) includes and/or has access to a random number generator (e.g., random number generator 226 shown in FIG. 2). This random number generator generates a truly random number, which is then input into an encryption algorithm for creating encryption keys that are used to generate a digital signature for the IoTSD. That is, the random number generator is used to generate the random number, which is used to create an encryption key, which is used to generate a digital signature for the IoTSD.

In an embodiment of the present invention, the one or more provenance tracking sensors detect a physical movement of the physical product from a first location to a second location; and populate the IoTSD with a record of the physical movement of the physical product from the first location to the second location in order to further establish the provenance of the physical product. That is, and as shown in FIG. 3, the positioning device 212 shown in FIG. 2 detects any movement from one location (e.g., the manufacturing plant where the physical product was built) to another location (e.g., a warehouse where the physical product is stored), thereby tracking the provenance of the physical device.

In an embodiment of the present invention, wherein the physical product is stored within a locked container, such as a box that is locked by a physical lock. The state sensor (e.g., the physical lock sensor 220 shown in FIG. 2) detects that the previously locked container has been unlocked. As such, the state, condition, and/or provenance are now no longer verifiable, since the product has been made available for alteration, theft, replacement, etc.

In an embodiment of the present invention, the state sensors detect that the physical product has been exposed to a predefined environmental condition. For example, in an embodiment of the present invention, the state sensor is the moisture detector 216 shown in FIG. 2. As such, if the moisture detector 216 detects moisture, then a conclusion is reached that the physical product 224 has gotten wet, and thus is likely damaged.

In an embodiment of the present invention, the terminal receives an on-line record of a change of ownership of the physical product. The terminal then transmits, to the blockchain, an ownership transaction that describes the change of ownership of the physical product, such that the blockchain adds the ownership transaction to the blockchain that is dedicated to the physical product. That is, although the IoTSD remains off-line at all times, the terminal can supplement the provenance/state information about the physical product 424 shown in FIG. 4 with information about a change in ownership of the physical product 424, even if there is no change to the movement of the physical product, no change in the environment of the physical product, no change to the state of the physical product, etc.

In an embodiment of the present invention, a first hardware interrogator (e.g., a first interrogator having the architecture of interrogator 408 shown in FIG. 4) interrogates the physical product at a first location. A supervisory computer, such as supervisory computer 430 shown in FIG. 4, determines that the physical product has moved from the first location (e.g., the manufacturing facility 303 shown in FIG. 3) to a second location (e.g., the warehouse 309 shown in FIG. 3). For example, in an embodiment of the present invention the supervisory computer receives an email, a user input, a software generated message from a provenance tracking program, etc. indicating that the physical product has left the manufacturing facility 303 and is on its way to the warehouse 309. In response to determining that the physical product has moved from the first location to the second location, the supervisory computer sends a first signal to the first hardware interrogator that causes the first hardware interrogator to be disabled. The terminal sends a second signal to a second hardware interrogator at the second location causing the second hardware interrogator to be activated. More specifically and in an embodiment of the present invention, these disabling and activation signals are sent to an activating/disabling hardware 432 shown in FIG. 4. This activating/disabling hardware 432, which in various embodiments activates/disables the interrogator's ability to interface with the interrogator interface 210 of the IoTSD 253, activates/disables a power source 202 for the interrogator, etc.

As described herein, the present invention utilizes a new and useful improvement over prior art systems for tracking the provenance and physical state of products. Rather than using a digital identifier/tracker (e.g., an RFID chip) that can be altered, counterfeited, hacked, etc.) to track a product, the present invention utilizes an IoTSD that is enrolled in a membership service, which issues certificates of enrollment of the IoTSD, and certifies each transaction/movement/state change of the physical product by requiring that each such change be identified and reported by the enrolled IoTSD.

Furthermore, and in one or more embodiments of the present invention, when the interrogator interrogates the IoTSD, a transaction is automatically sent to the blockchain, such that there is no involvement of the user with the blockchain and the blockchain that describes the provenance and/or state of the physical product.

Thus, and in one or more embodiments of the present invention, the IoTSD acts as a digital identifier that contains a physical product's credentials, state information, and enrollment certificates issued at the point of origin by the trusted membership service. These credentials allow the IoTSD to authenticate to the online service running on (or associated with) the interrogator device. That is, since the IoTSD is not online, it requires the online service to issue transactions on its behalf.

In one or more embodiments of the present invention, the IoTSD registers and moves key information (i.e., provenance and state information) to an interrogator terminal that is online. The interrogator terminal thus submits transactions on behalf of IoTSD device after a secure connection and authorization mechanism has been established between them.

In an embodiment of the present invention, the interrogator (e.g., interrogator 408 shown in FIG. 4) is also enrolled with the membership services 406, such that any information pulled from the IoTSD 453 is deemed to be trusted based on the enrollment and verification (by a certificate from the membership services) of the interrogator whenever it pulls information from the IoTSD 453.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
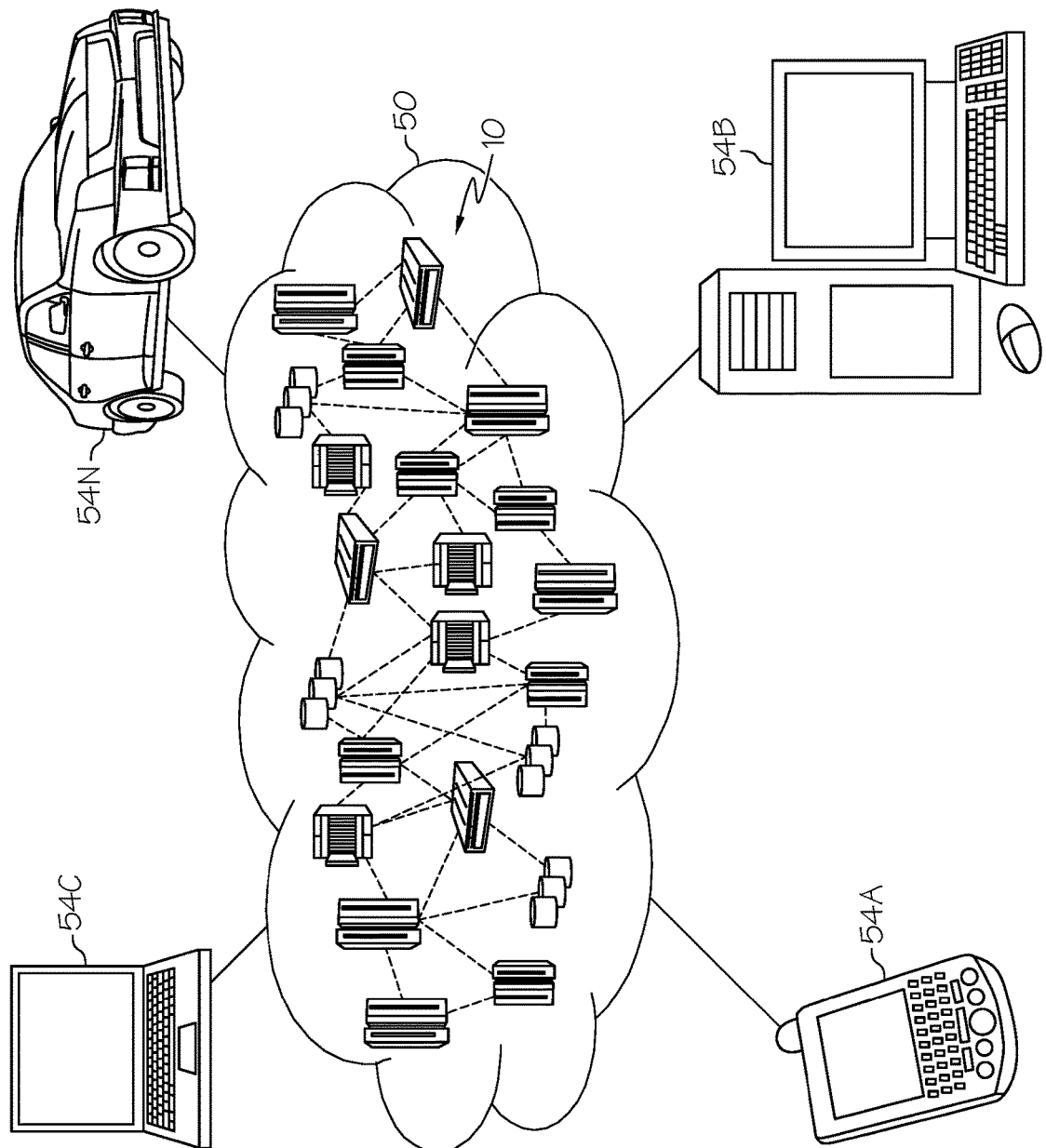
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
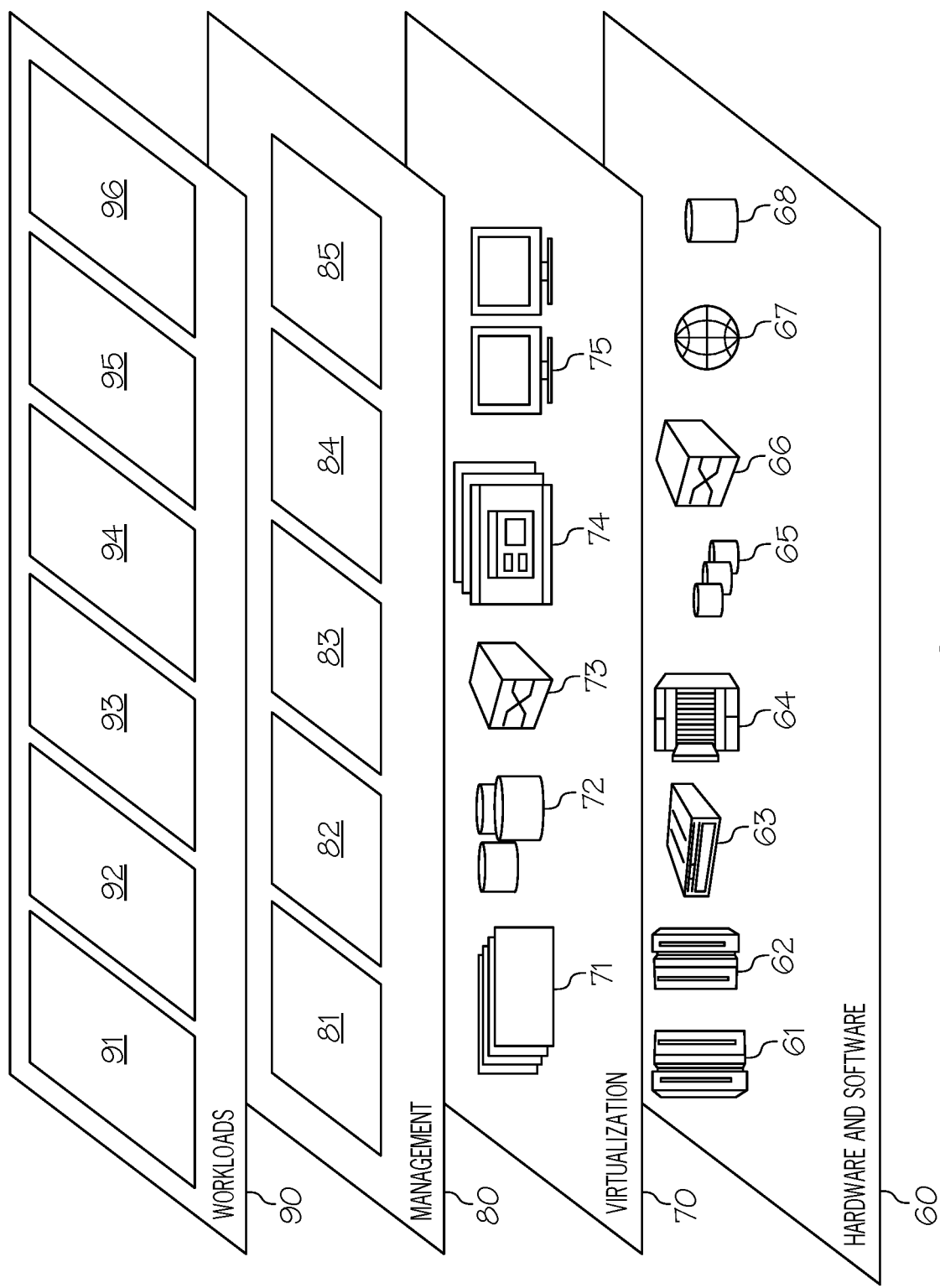
FIG. 11 depicts abstraction model layers of a cloud computer environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and blockchain interfacing processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   interrogating, by a hardware interrogator in a terminal, an Internet of Things Smart Device (IoTSD), wherein the IoTSD is an off-line device that is associated with a physical product, wherein the hardware interrogator interrogates a memory and sensors within the IoTSD, wherein the IoTSD only communicates with the hardware interrogator, and wherein the IoTSD comprises:
   a cryptographic processor, and
   one or more state sensors that monitor a state of the physical product, wherein the hardware interrogator is prompted to interrogate the IoTSD in response to the one or more state sensors in the IoTSD sensing a change in a state of the physical product;
   detecting, by the hardware interrogator, an event that is described by an encrypted entry in the IoTSD, wherein the encrypted entry is encrypted by the cryptographic processor in the IoTSD; and
   transmitting, from the terminal to a blockchain, a transaction that describes the event that is detected by the hardware interrogator, wherein the blockchain adds the transaction to a blockchain that is dedicated to the physical product, and wherein the blockchain establishes a state of the physical product.

2. The method of claim 1, wherein the IoTSD is verified for use with the physical product by a membership service.

3. The method of claim 1, wherein the IoTSD further comprises one or more provenance tracking sensors that track a provenance of the physical product, and wherein the method further comprises:
   receiving, by the terminal, a request for a provenance and state record of the physical product; and
   in response to receiving the request for the provenance and state record of the physical product, directing, by the terminal, the blockchain to publish the blockchain that is dedicated to the physical product to include the provenance and state record of the physical product.

4. The method of claim 3, wherein a sender of the request is prohibited from directly accessing the blockchain, and wherein the blockchain only accepts requests for the provenance and state record of the physical product from the terminal.

5. The method of claim 1, wherein the IoTSD is affixed to the physical product.

6. The method of claim 5, wherein the IoTSD is affixed to a specific instance of the physical product when the specific instance of the physical product is manufactured at a manufacturing facility.

7. The method of claim 1, wherein the cryptographic processor comprises a random number generator for creating encryption keys that are used to generate a digital signature for the IoTSD.

8. The method of claim 1, wherein the IoTSD further comprises one or more provenance tracking sensors, and wherein the one or more provenance tracking sensors:
   detect a physical movement of the physical product from a first location to a second location; and
   populate the IoTSD with a record of the physical movement of the physical product from the first location to the second location in order to establish a provenance of the physical product.

9. The method of claim 1, wherein the physical product is stored within a locked container, and wherein the state sensors:
   detect that the locked container has been unlocked.

10. The method of claim 1, wherein the one or more state sensors:
    detect that the physical product has been exposed to a predefined environmental condition.

11. The method of claim 1, further comprising:
    receiving, by the terminal, an on-line record of a change of ownership of the physical product;
    transmitting, from the terminal to the blockchain, an ownership transaction that describes the change of ownership of the physical product, wherein the blockchain adds the ownership transaction to the blockchain that is dedicated to the physical product.

12. The method of claim 1, further comprising:
    interrogating, by a first hardware interrogator, the physical product at a first location;
    determining, by the terminal, that the physical product has moved from the first location to a second location;

in response to determining that the physical product has moved from the first location to the second location, disabling the first hardware interrogator at the first location and activating a second hardware interrogator at the second location.

13. The method of claim 1, further comprising:
interrogating, by a first hardware interrogator, the physical product at a first location;
determining, by the terminal, that the physical product has moved from the first location to a second location;
in response to determining that the physical product has moved from the first location to the second location, prompting the hardware interrogator to interrogate the IoTSD for location information regarding the second location of the IoTSD.

14. The method of claim 1, wherein the one or more state sensors comprise a thermometer that measures a real-time temperature of the physical product, a humidity detector that detects moisture within the physical product in real time, and an accelerometer that detects the physical product being dropped in real time.

15. The method of claim 1, wherein the physical product is stored in a protective container by a security wire that loops through security loops that hold the protective container closed, wherein a physical lock sensor includes an electronic circuit that includes the security wire, wherein the electronic circuit opens in response to the security wire being cut, and wherein the method further comprises:
in response to the electronic circuit opening, generating, by the physical lock sensor, a digital signal indicating that the security wire has been cut;
in response to the security wire being cut, generating, by the IoTSD, an encrypted packet from the digital signal indicating that the physical product has been tampered with based on the security wire being cut; and
transmitting, from the IoTSD to the blockchain, the encrypted packet indicating that the security wire has been cut and that the physical product has been tampered with.

16. The method of claim 1, further comprising:
enrolling with a membership service the IoTSD, the hardware interrogator, and nodes in a blockchain server that supports the blockchain, wherein said enrolling authorizes the hardware interrogator, and the nodes in the blockchain server that supports the blockchain as the only devices that are authorized to handle data from the IoTSD, wherein a public ledger server is not enrolled with the membership service, and wherein any attempt by the public ledger server to send a transaction regarding the physical product to the blockchain server is thwarted.

17. The method of claim 1, wherein the transaction is automatically sent from the terminal to the blockchain in response to the hardware interrogator detecting a change to the state of the physical product.

18. The method of claim 1, further comprising:
establishing a secure connection and an authorization mechanism between the IoTSD and an online interrogator terminal;
authorizing, by the authorization mechanism, the online interrogator terminal to submit transactions to the blockchain on behalf of the IoTSD;
in response to authorizing the online interrogator terminal to submit transactions to the blockchain on behalf of the IoTSD, transmitting, from the IoTSD to the online interrogator terminal, transactions that describe the state of the physical product to the blockchain; and
submitting, by the online interrogator terminal, the transactions that describe the state of the physical product to the blockchain.

19. A computer program product for imposing trust at an edge of a blockchain, wherein the computer program product comprises a non-transitory computer readable storage device having program instructions embodied therewith, the program instructions readable and executable by a computer to perform a method comprising:
interrogating, by a hardware interrogator in a terminal, an Internet of Things Smart Device (IoTSD), wherein the IoTSD is an off-line device that is associated with a physical product, wherein the hardware interrogator interrogates a memory and sensors within the IoTSD, wherein the IoTSD only communicates with the hardware interrogator, and wherein the IoTSD comprises:
a cryptographic processor, and
one or more state sensors that monitor a state of the physical product, wherein the hardware interrogator is prompted to interrogate the IoTSD in response to the one or more state sensors in the IoTSD sensing a change in a state of the physical product;
detecting, by the hardware interrogator, an event that is described by an encrypted entry in the IoTSD, wherein the encrypted entry is encrypted by the cryptographic processor in the IoTSD;
and transmitting, from the terminal to a blockchain, a transaction that describes the event that is detected by the hardware interrogator, wherein the blockchain adds the transaction to a blockchain that is dedicated to the physical product, and wherein the blockchain establishes a state of the physical product.

20. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories to perform a method comprising:
interrogating, by a hardware interrogator, an Internet of Things Smart Device (IoTSD), wherein the IoTSD is an off-line device that is associated with a physical product, wherein the hardware interrogator interrogates a memory and sensors within the IoTSD, wherein the IoTSD only communicates with the hardware interrogator, and wherein the IoTSD comprises:
a cryptographic processor, and
one or more state sensors that monitor a state of the physical product, wherein the hardware interrogator is prompted to interrogate the IoTSD in response to the one or more state sensors in the IoTSD sensing a change in a state of the physical product;
detecting, by the hardware interrogator, an event that is described by an encrypted entry in the IoTSD, wherein the encrypted entry is encrypted by the cryptographic processor in the IoTSD; and
transmitting, to a blockchain, a transaction that describes the event that is detected by the hardware interrogator, wherein the blockchain adds the transaction to a blockchain that is dedicated to the physical product, and wherein the blockchain establishes a state of the physical product.

* * * * *